Oct. 22, 1968  A. L. FASSAUER  3,407,007
SILO AND SILO COMPONENTS
Filed Aug. 26, 1966  7 Sheets-Sheet 1

A. L. FASSAUER
INVENTOR.

BY Ely Silverman
ATTORNEY

Oct. 22, 1968     A. L. FASSAUER     3,407,007

SILO AND SILO COMPONENTS

Filed Aug. 26, 1966     7 Sheets-Sheet 2

A.L. FASSAUER
INVENTOR.

BY Ely Silverman

ATTORNEY

A.L. FASSAUER
INVENTOR.

BY
Ely Silverman
ATTORNEY

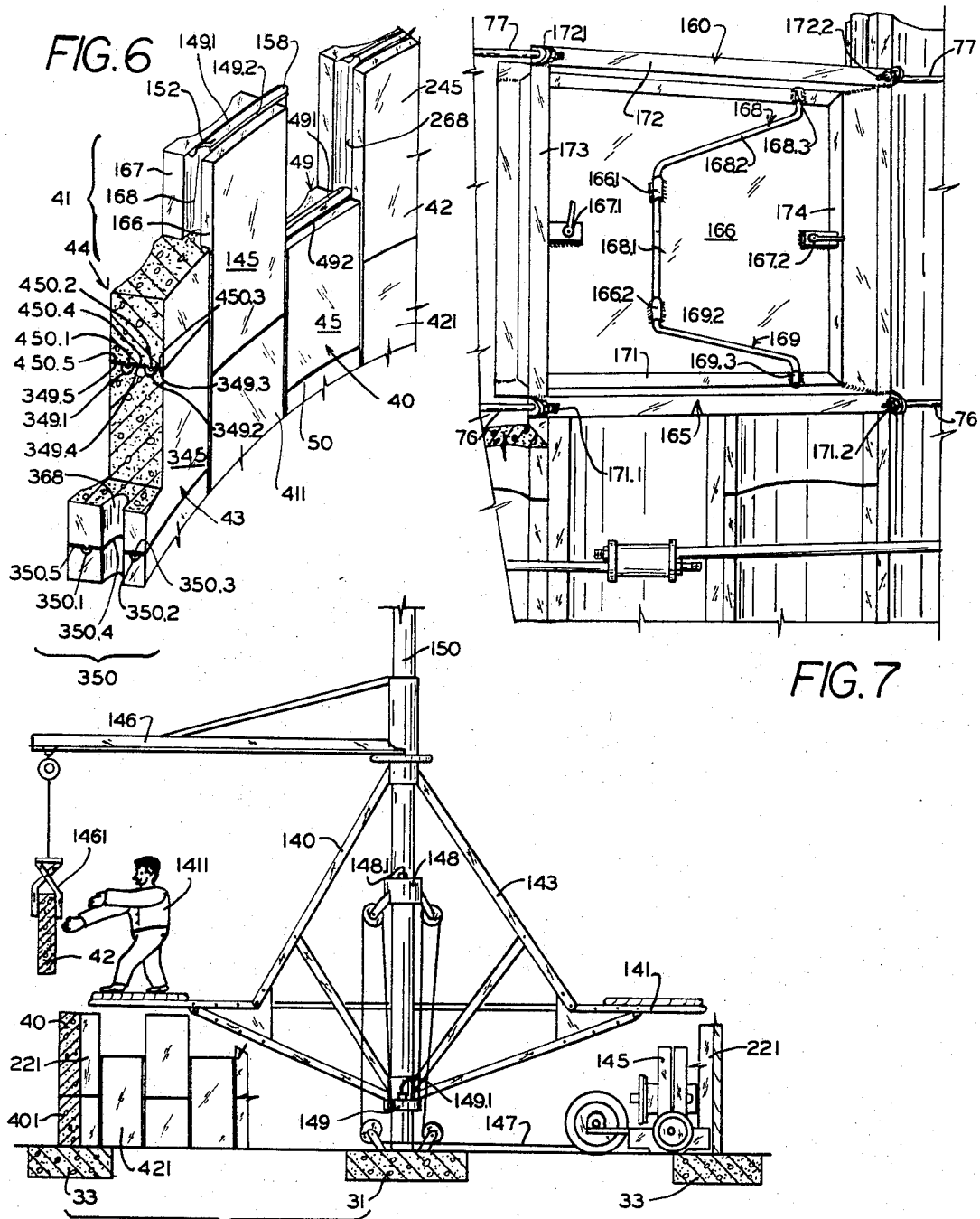

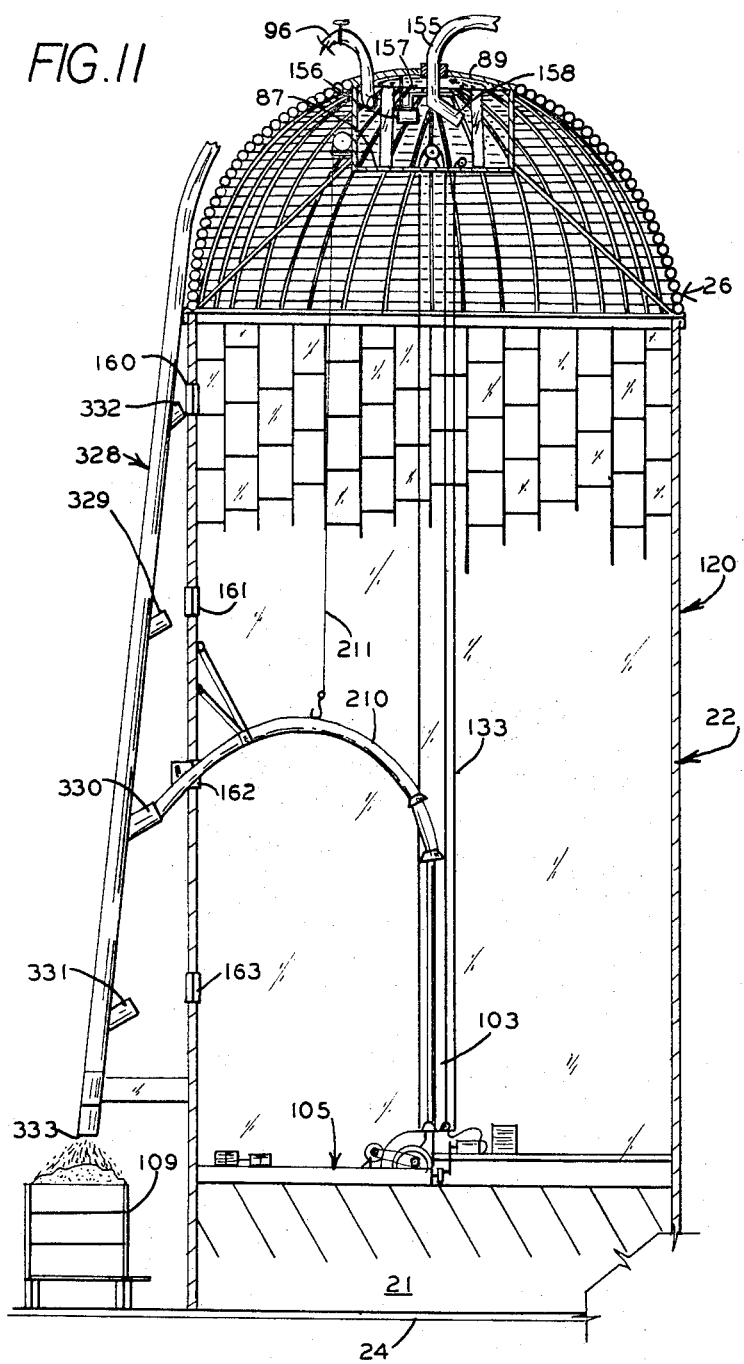

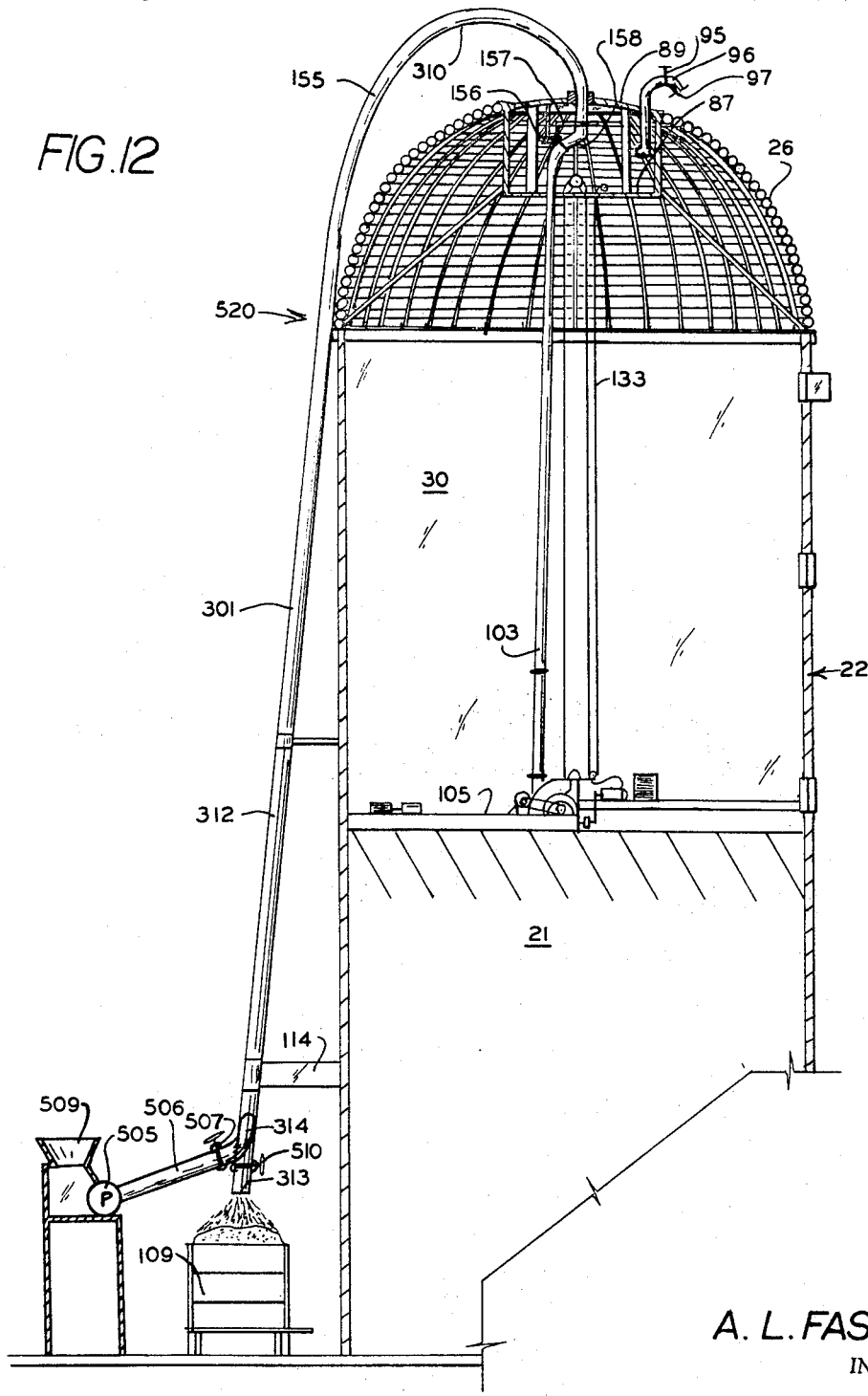

United States Patent Office 3,407,007
Patented Oct. 22, 1968

3,407,007
SILO AND SILO COMPONENTS
Arthur L. Fassauer, Canyon, Tex., assignor to Gifford-Hill
Western, Inc., Lubbock, Tex.
Filed Aug. 26, 1966, Ser. No. 575,331
8 Claims. (Cl. 302—56)

This invention relates to improvements in silos. More particularly, this invention relates to an improved silo wall construction, an improved roof for a silo, and an improved unloader for a silo, the improvements in construction of the silo wall cooperating with the improved roof structure and the unloader in a silo structure including the wall, roof and unloader.

It is well known that where masonry silos are used in sections of the country subject to extreme change of temperature, the concrete foundation is liable to heave and settle under the action of frost and thaw out and, if the concrete blocks of the silo are united solely by cementitious material, the change in the foundation or the heaving and settling of the wall will crack the cementitious material and open the joints between the blocks or even crack the blocks themselves and harm the roof. By constructing the blocks with the seals and seats and employing the joints below described, I am able to secure airtight joints which maintain their airtight condition under all conditions of weather and although the range in temperature be from below zero to over 120 degrees F. Otherwise stated, if there is any heating or settling of the foundation as well as whether or not there is contraction or expansion of the blocks themselves due to changes of temperature according to the structure of this invention there will be no opening of the joints; although the slabs and portions of the roof may move relative to each other, nevertheless the joints therebetween keep their airtight condition. The unloader used herewith provides no stress to the particular roof surface disclosed hereinbelow, and the wall structure of this invention, which wall is particularly resistant to damage from vibration, receives a minimum of stress from the unloading mechanism herein disclosed.

Accordingly, one object of this invention is to provide an improved combination of silo wall construction, silo roof construction, and a silo unloader;

Another object of this invention is to provide an improved silo unloader;

A further object of this invention is to provide an improved roof for a silo;

Still a further object of this invention is to provide an improved silo wall construction.

These and other objects of this invention will become apparent to those skilled in the art on a study of the hereinbelow provided description of the invention and the embodiments thereof and by reference to the hereto attached drawings, which drawings form a part of the description of this invention and in which drawings the same reference numeral refers to the same part throughout.

In the drawings FIGURE 1 is an overall longitudinal sectional view of a silo apparatus and unloader according to this invention in one position of the unloader assembly;

FIGURE 6 is a perspective view, partly broken away and partly in section, of the interior surface of the portion of the silo wall shown in FIGURE 4 generally as viewed in the direction of the arrow 6A of FIGURE 3.

FIGURE 7 is a view of a section of the wall containing an access door;

FIGURE 8 is a diagrammatic longitudinal cross sectional view of the erection apparatus used for the construction of the walls of the apparatus of FIGURES 1–6.

FIGURE 11 is another embodiment of discharge apparatus according to this invention;

FIGURE 12 is another embodiment of discharge apparatus connection according to this invention.

Figure 1:
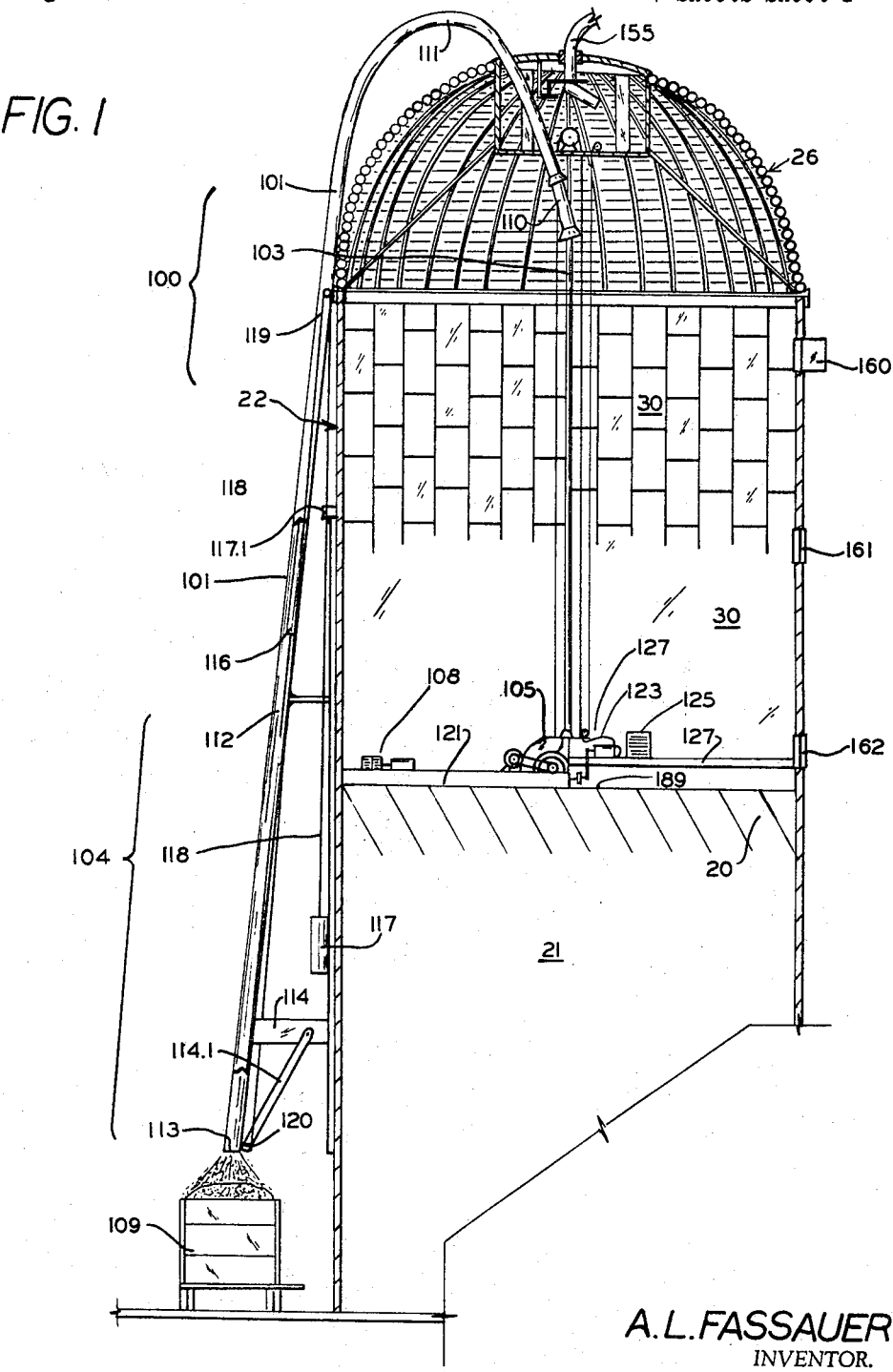

One embodiment 20 of this apparatus according to this invention is shown in FIGURE 1 and comprises a hollow cylindrical wall 22, a base 24, a roof 26 and an unloading system 28 in operative combination.

Base 24 comprises a central portion 31 which is used as the support for the erection mechanism and an annular ring 33 which is used and serves as the support for the wall. The annular ring 33 is of sufficient width to provide support for the weight of the wall 22 thereabove. In the preferred embodiment the width of the base at the bottom of the base is 1/20 of the height of the wall to provide a maximum ground load of 1000 lbs. per sq. ft.

The wall 22 is formed of a plurality of like concrete blocks or staves as 40–44 arranged in a circular fashion with laterally adjacent staves at different vertical levels and with tightening cables, as 71, 72, 73, and 74 therearound. The wall staves 40, 41, 42, 43, 44 are all of the same size and shape. Adjacent staves are nested together and at any one enclosing silo chamber 30 in a circle to form a hollow cylinder.

Each of the staves as 40 is formed of a body portion having an inner vertical face 45, an outer vertical face 46, a left vertical side face 47, and a right vertical side face 48, a top generally horizontal face 49, and a bottom generally horizontal face 50. The inner surface 45 is concave with a radius of about 20 feet. The outer surface 46 has a central depressed or recessed portion 52, which is concave outward and of vertical right cylindrical shape, and left shoulder 53 and right shoulder 54 which extend from the sides of portion 52 to the side edges 47 and 48.

The left side face 47 comprises a left central flat vertical portion 56, an outer flat vertical portion 57, and a central outwardly convex tongue portion 58. The right side face 48 has a central flat vertical portion 66 and an outer flat vertical portion 67, a central outwardly concave groove portion 68, and an inner rightwardly projecting lip 65 at the inner edge of portion 66.

Tongue portion 58 is a segment of a vertical elongated solid right cylinder. The surface of groove portion 68 is a surface which is a segment of a vertically elongated right circular cylinder of the same radius as is the outer surface of portion 58. Portion 58 and portion 68 are parallel to each other and each extend the full height of the block 40. Their exterior surfaces are quite smooth and dense both on the surface of portion 68 and on the outer portion of portion 58 and on corresponding surfaces of all the other staves in the wall 22. The curvature of the portion 68 is the same as the curvature of the portion 58 although 58 is convex and 68 is concave outward.

The outer surface of the tongue portion 58 extends slightly further outward from a flat vertical plane which passes between surfaces 56 and 57 than the depth of the recess provided by groove portion 68 from a flat vertical plane between surfaces 66 and 67. The lip 65 does not project from surface 66 a distance which is greater than the difference between the depth of the tongue 58 and the depth of the groove 68: the projection of lip 65 is slightly less than that difference to permit that there be an angle less than 180 degrees (to provide top wall curvature) between the inner surfaces as surface 145 and 45 of adjacent blocks as 41 and 40.

The vertical axis of the right vertical cylindrical surface that forms the outer surface of tongue portion 58 and the axes of the right circular cylindrical surface of concave groove portion 68 on block 40 are equally spaced from and are both parallel to each other and to the inner surface 45 of the block 40 and the vertical axes of portion 68 and portion 58 lie in a vertical plane located halfway from the wall surface 45 to the point of maximum recess of portion 52.

The brick 42 has the same structure as does the concrete block 40 with corresponding portions in the block 42 shown with numbers 200 units higher than those for the block 40. The parts and portions of blocks 41, 43 and 44 are given reference numerals 100, 300 and 400 units higher, respectively, than for the corresponding parts and portions of block 40. The tongue portion 158 of the block 41 fits into the concave groove portion 68 of the block 40 to provide a smooth bearing fit therewith. The tongue portion 58 of block 40 fits into the concave portion 268 of block 42 to provide a smooth bearing fit therewith. Tongue portion 358 of block 43 fits into concave groove portion 168 of block 41 to provide a smooth bearing fit therewith.

The tightening cables as 74 are joined by standard tighteners, as 75, to keep these firmly together and the force is distributed parallel to the inner faces as 145, 45, and 245 of the blocks 41, 40 and 42 by the bearing surfaces as 358, 168, 158, 68, 58 and 268 and is evenly distributed over those surfaces because of their matching fit. The top surface as 49 of each stave as 40 comprises, in radial outward sequence, an inner flat horizontal bearing surface 49.3, of rectangular outline, an inner downwardly extending straight recess 49.2, a rectangular intermediate flat horizontal bearing surface 49.4, an outer downwardly extending straight recess 49.1, and an outer flat horizontal U-shaped bearing surface 49.5. Surfaces and grooves 49.1–49.5 each extend the full side to side width of the top of the stave 40 except for the projection of the tongue 58. The bottom surface of each stave, as surface 350 of stave 43, comprises, in radial and outward sequence, an inner flat bearing horizontal surface 350.3 of rectangular outline, an inner straight downwardly extending rib 350.2, an intermediate flat horizontal bearing surface 350.4, an outer straight downwardly extending rib 350.1, and an outer U-shaped flat horizontal bearing surface 350.5. Surface 350.1 to 350.5 each extend the full side to side width of stave 43 except for the sideways projection of tongue 358.

The recesses as 49.2 and 49.1 are parallel to the inner surface as 45 of the stave 40 in which stave each such recess lies and are of uniform cross section for their entire length.

The downwardly extending rib of each block as ribs 350.1 and 350.2 are each of uniform transverse cross section and have their centers at the same distance from the inner surface of those blocks as the distance from the inner surface of those blocks to the center of the tongues as 349.1 and 349.2 of such blocks. However, the depth and width of the recesses as 349.1 and 349.2 on each block is greater than the depth and width of projection of the tongue on the bottom surface of that block and of the block, as 44, thereabove. Accordingly, according to this invention the flat surfaces 49.3, 49.4 and 49.5 bear the weight of the block thereabove inasmuch as the flat top surfaces of 49.3, 49.4 and 49.5 of the upper surface 49 of each block as 40 contacts the corresponding flat horizontal portions of the block thereabove as shown for the surfaces 349.3, 349.4, and 349.5 of block 43 contacting and supporting surfaces 450.3, 450.4 and 450.5 of block 44.

The downwardly projecting tongues on the bottom surface of each block, as tongues 450.1 and 450.2 of block 44 fit into the grooves as 349.1 and 349.2, respectively, of the block as 43 therebelow. This provides for alignment therebetween, and with the sealant in the grooves, for an airtight seal.

Figure 3:
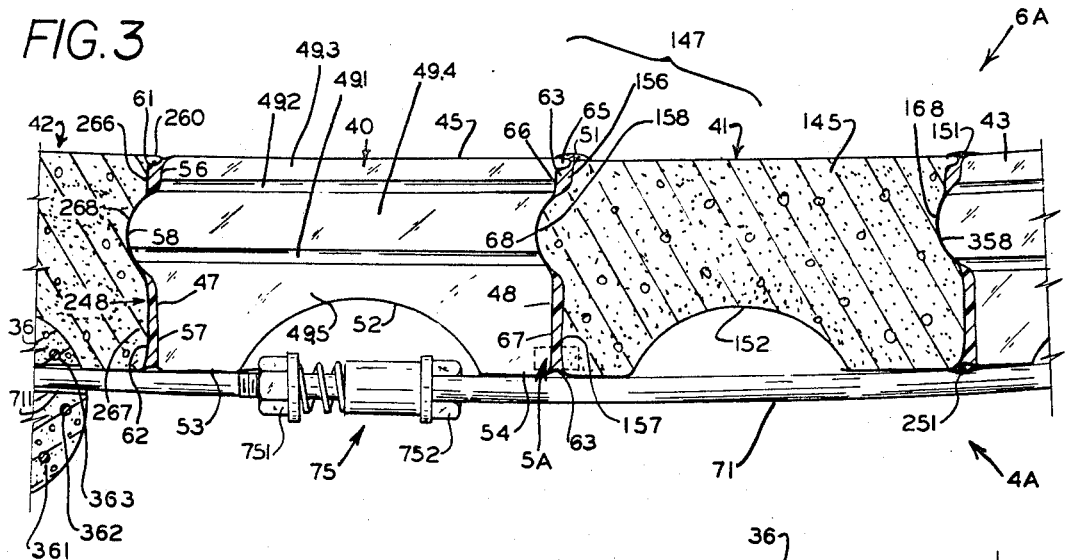
FIGURE 3 is an enlarged horizontal sectional and plan view of a section of the wall as shown along the horizontal plane 3—3 of FIGURE 4.
Figure 5:
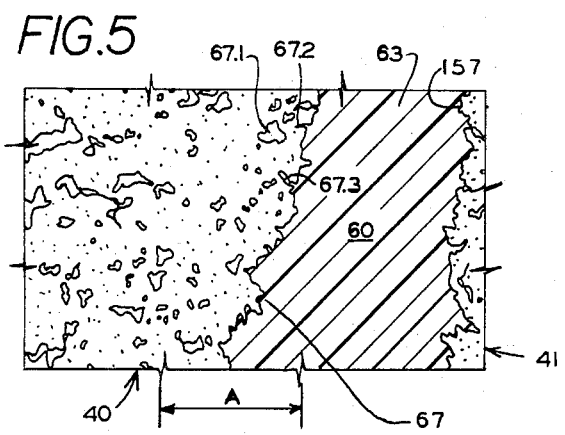
FIGURE 5 is an enlarged view of zone 5A of FIGURE 3, the degree of enlargement being shown by that the distance A is ¼ of an inch.
Figure 9:
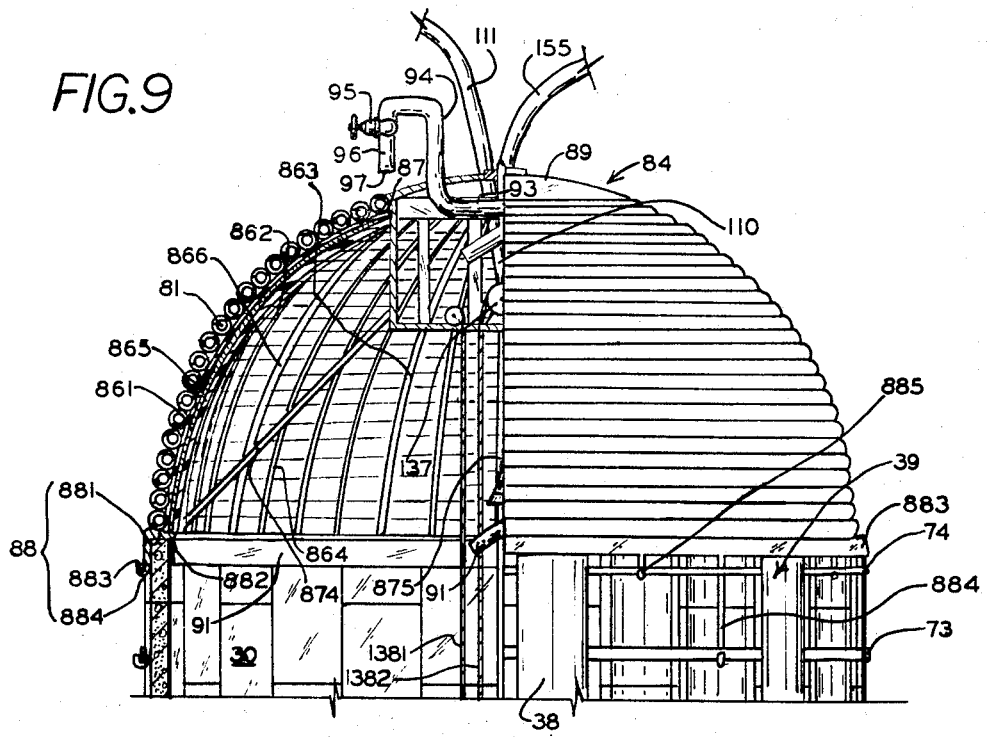
FIGURE 9 is an enlarged view of the roof zone shown in FIGURE 1, the right half of FIGURE 9 is a side view, the left half of FIGURE 9 is an enlarged longitudinal sectional view of the apparatus shown in FIGURES 1 and 2.

The above stave structure and relations provide that, as shown in FIGURE 3, there is a cavity 61 between the stave side surface 266, the lip 265, the surface 56, and a portion of the surface 58. Also there is a similar cavity 63 between the wall 66, the wall surface 156, the lip 65, and a portion of the tongue 158. A cavity 62 is provided between the surfaces 267 on block 42, surface 57 on block 40. A cavity 63 is provided between the surfaces 67 on block 40, surface 157 on block 41. As shown in FIGURE 5, the sealing material 60 in cavity 63 forms a firm airtight watertight seal between the side walls thereof as 67 and 157. Each cavity as 61, 62, 63 and 64 filled, as below described, with a wax 60 which is firmly adherent to the concrete surfaces on both sides of such cavity, i.e. to the concrete surface 266 and surface 56 for the cavity 61. This sealing material is a microcrystalline wax which is firmly adherent to the surface of the concrete and penetrates thereto to a depth about the size of the holes in the concrete. As shown in FIGURE 5, the concrete of the staves is wetted by the wax 60. There are many small interstices therein as 67.1, 67.2, 67.3, of about 0.02 inch to 0.08 inch in length and 0.01 to 0.03 inch in width. Because of its affinity for concrete surface, the microcrystalline wax material (i.e. Be Square 170 flows into and fills the interstices of the surfaces and firmly binds thereinto and serves as a sealant as well as a lubricant between adjacent surfaces (e.g. 58 and 268). The mass of plastic 60 such as is located in the cavities 61 and 63 is, additionally, gummy and can expand as the surfaces 266 and 56 (and corresponding surfaces as 66 and 156) expand. Additionally, the material 60 is relatively fluid and as the surfaces as 266 and 56 of cavity 61 approximate each other, the gummy mass accommodates to such movement and so provides maintenance of a firm airtight and watertight seal between those surfaces and the other surfaces in wall 22 similar thereto in cavities such as 62, 63 and 64.

In the preferred embodiment of the invention, the inner face 46 is 10¾ inch wide from face 56 to lip 65, the outside surface 46 is 11 inches wide from face 57 to face 67. The side lip or right lip 65 provides a channel ¼ inch wide down which the wax flows as below described. The side faces as 47 and 48 are 6 inches wide and the height of each of the staves as 43 is 30 inches from face 349.3 to face 350.3. The wax 60 is adherent to the concrete and penetrates thereinto to about a depth of $\frac{1}{64}$ to $\frac{1}{16}$ inch so as to provide lubricating action for pivoting motion of the blocks as 41 and 40 relative to other and vertical sliding motion of blocks as 41 and 42 relative to intermediate blocks as 40 and thereby avoids any such concentration of mechanical stresses as might provide for cracking of the blocks. The meeting of the matching round tongues as 158 and 58 and the adjacent grooves as 68 and 268 bears the compression stress produced by the cables as 71, 75 on a large curved area of contact rather than on the smaller flat shoulder areas as 157 and 67 which provide base for the sealing material between the vertical faces.

The wax 60 is sufficiently adherent to the concrete that the adjacent surfaces never touch each other. At the same time, the wax under high pressures does provide a low friction fluid medium of sufficient thickness (in excess of $\frac{1}{40,000}$ of an inch) to allow such neighboring surfaces and the wax layer adherent thereto to slip past each other; i.e. the tongue and groove joint is lubricated.

The adjacent flat areas horizontal surfaces as 450.3, 349.3, and 450.4 and 349.4 and 450.5 and 349.5 bear the compressive stress; concurrently, the grooves as 349.1 and 349.2 and tongues as 450.1 and 450.2 and wax material therein and filling such grooves provide for a continued airtight and watertight seal, and also permit radial alignment of each of the blocks with the blocks vertically above, e.g. 42 with 421, 41 with 411, as such tongues and grooves provide radial alignment by the interlocking of such tongues and grooves.

Figure 2:
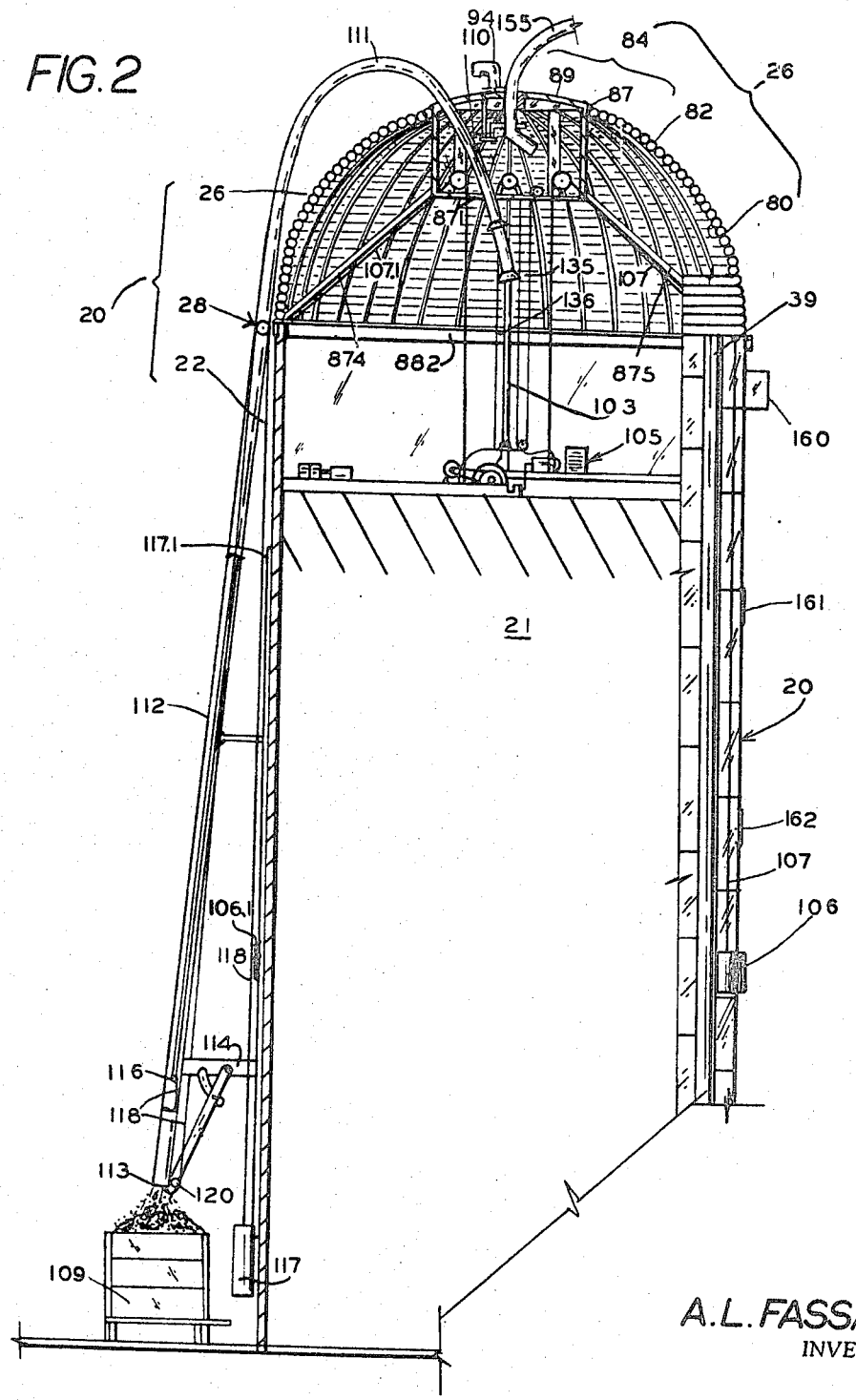
FIGURE 2 is a view taken as in FIGURE 1 and in a different position of the unloader assembly.
Figure 4:
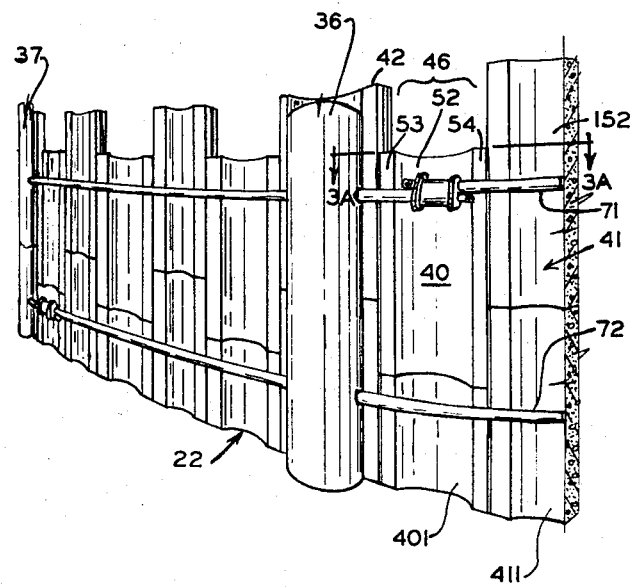
FIGURE 4 is a perspective oblique view of a portion of wall 22 along the direction of arrow 4A of FIGURE 3 during construction of the wall.

These staves forming the wall 22 are nested together in a circular fashion with the left side as 47 of one stave, as 41 adjacent the right side, as 48 of the stave as 40 adjacent thereto. All of the staves as 41–44 of the wall 22 are alternately arranged with the staves alternately high and low as shown in FIGURES 1, 2 and 4. Thereby, the tongue and groove relations of staves as 41 and 411 and 42 and 421 on each side of each stave as 40 provide for alignment and lateral support for that stave (as 40) and the tongue of that stave 40 provides for alignment of stave 42 to 421 therebelow and the groove of stave 40 provides, with tongues of staves 41 and 411, for vertical alignment of staves 41 and 411.

To further improve the strength of the wall 22, longitudinally extending solid rigid cylindrical columns as 36, 37, 38, 39 made of concrete and reinforced with steel reinforcing bars as 361, 362, 363 are located within the curved surface portions of the staves as 42 (portion corresponding to portion 52 of stave 40) and extend the full height of the wall of the silo 20. These columns are connected to each of the hoops as 71–73. Each of the hoops passes through a channel therefor as 711 in column 36. The hoops fit slidably in the channels and so permit the hoops to expand or contract without transverse stress on those columns. The columns form a snug fit with the adjacent concave portion of the staves, as 42 and 421 adjacent thereto. The columns serve to maintain the staves of wall 22 in fixed longitudinal alignment and to fix the vertical location of the hoops passing therethrough; thereby wind and other bending stress which might be applied to only one portion of the wall 22 are partly absorbed by these columns and thereby distributed to and borne by other portions of wall 22.

The surface of each column as 36 adjacent to the external concave surface of a stave as 42 is coated with the same wax as used in cavities 61–64 to reduce friction between those wall and column surfaces and to prevent accumulation of water therebetween.

According to the apparatus of this invention, not only is a continuous seal afforded by the hydrophobic wax used as the sealant 60 but also the substantial compressive strength of the concrete is used to afford a firm connection between the blocks as at surfaces 158 and 68. On expansion of the blocks due to expansion in temperature, which expansion also causes the usual steel hoops to expand to an even greater extent than the cement, the cement rods expand and reduce the compressive stress of the spaces between the blocks. This is helpful inasmuch as it reduces the stress exactly when needed, i.e. at a time of elevated temperature where the blocks themselves expand and it is desired to reduce the stress on the block; this temperature expansion stress release creates a potential loosening of the spaces between the shoulder as 67 and 157, and 66 and 156, and 266 and 56, and 57 and 267. The tongue and groove joints according to this invention are however, maintained airtight although pivotal relative to each other by the firm adhesion of the microcrystalline wax material to the surfaces as 67 and 157 and 66 and 156 and 266 and 56 and 57 and 267 of the blocks and the elastic resinous nature of the sealant 60. On cooling of the ambient air external to the silo blocks, the steel hoops are contracted; this is desirable inasmuch because, at the lower temperature the concrete blocks although to a smaller degree, also contract. However, in past practice where it has been necessary to keep the hoops sufficiently tight so that their enlargement due to temperature change would not cause an undesirable loosening of the joints between the blocks at elevated temperature; such tightness would, however, be deleterious when the temperature was cold because at such cold temperatures the contraction of the steel would be so great as to do damage to the blocks. By the arrangement of this invention the steel rods do not have to be so tight during the cold weather as to cause any damage to the structure because of their tension and, because of the adherence of the sealant for the blocks even at elevated temperatures, the hoops above are not depended upon for maintenance of the airtight seal between the staves. Thus, during cold weather the temperature change of the hoop will not crack the blocks and during warm weather the expansion of the blocks and the rods is not critical to opening of the joints because the hydrophobic yet concrete-adherent elastic material between the blocks is firmly adherent to the block surfaces as well as elastic and does not lose its seal even on substantial expansion or movement of the space between the blocks due to temperature. Accordingly, an airtight seal is maintained between the staves or blocks notwithstanding the contraction and expansion of the blocks due to temperature and wind as well as that the lubrication aspects above discussed is also provided by the type of wax sealant used.

The roof assembly 26 comprises an open frame 80 and, firmly attached this frame a flexible airtight, watertight roof surface 82, which roof surface also serves as an air pressure relief means, and a transition and distributor assembly 84.

The frame 80 for the roof assembly comprises a plurality of radially, equally spaced arched tubings, as 861, 862, 863, 864 and 865, an upper spider ring 87, and a lower saddle 88. The saddle 88 comprises a flat steel annular plate 881, an inner hollow cylindrical skirt or ring 882 and an outer hollow cylindrical skirt or ring 883, operatively and firmly attached together.

The annular plate 881 is a flat ⅜ inch thick steel plate in the exemplary embodiment herein disclosed. Its outer diameter is the same as the outer diameter of wall 22, i.e. the same outer diameter as of the shoulders as 53 and 54 of each stave as 40 in the wall 22. The inner surface of the outer skirt 883 is firmly attached to the outer surface of the plate 881. The inner outline of the plate 881 is the same diameter as the internal surface of the wall 22, i.e. it is in line with the inner edge as 45 of the staves forming that wall. The inner surface of the inner skirt is, at its top, firmly attached to the inner edge or outline of the plate 881. The bottom of the skirt 883 is attached by stirrup hooks as 884 and 885 to the hoops as 74 and 73 nearest to the top of the silo wall. The plate 881 rests on top of the wall 22. The outer surface of skirt 882 fits against the interior of the wall 22. The stirrup holds the saddle in place on top of the silo wall as the hoops as 74 and 73 firmly grip the shoulders such as 52 and 53 of the adjacent staves and as the hoops are also located by channels therefor in the columns as 38 and 39 for such hoops. The saddle is thereby firmly fixed to the top of the wall 22 and serves to maintain the staves thereof in alignment.

The assembly 84 includes a work deck platform 871, and an upper transition plate 89 supported on the spider ring 87. The platform 871 is supported from the spider 87 and is also provided with rigid legs 874, 875 to support that platform directly on the saddle 88.

The beams as 861, 862, and 864 are, in the exemplary embodiment, ¼ inch steel tubing and are circular in shape. Each beam extends from the saddle 88 to the spider and is firmly attached to the saddle and to the spider and supports the spider.

In the 40 foot diameter 80 foot height embodiment of apparatus 20, the bottom of the beams, as 861, 862, 863, are spaced 42 inches from each other. Every fourth beam as 861 and 863 is encased in a sleeve as 865 and 886, respectively, of polyvinyl chloride of 2 inches internal diameter. This sleeve or tubing extends from the bottom of the beam at its attachment to the saddle upward to the spider and is continuous throughout. This tubing is thus slidably affixed to the pipe and supported thereby. The sleeves as 865 and 866 provide for a firm support of the roof surface to that frame 80.

The roof surface 82 is formed of continuous imperforate two inch internal diameter polyvinyl chloride plastic tubing which is formed in a spiral and caps and is supported by and attached to the frame 80. The tubing forms a complete surface and, as below described, the adjacent portions of the spider are cemented together to form an imperforate airtight and watertight roof surface.

The polyvinyl chloride used has the following characteristics:

| | |
|---|---|
| Continuous heat resistance | ° F. 212 |
| Heat distortion temperature | ° F. 150 |
| Specific gravity | 1.35 |
| Tensile strength, p.s.i. | 8,000 |
| Compressive strength, p.s.i. | 10,000 |
| Percent water absorption, 24 hr. | 0.05 |

This material is not affected by sunlight and is resistant to alkalies and weak acids.

The adjacent portions of the spiral are joined to each other by conventional solvent cement (also known as laminating thinners), such as one formed of 40% methyl ethyl ketone, 40% cyclohexanone, 20% propylene oxide. Other cements for holding the polyvinyl chloride to itself are well known to those skilled in the art, e.g. p. 490 Plastics Engineering Handbook, Society of Plastics Industry, Reinhold, 1960, 3rd edition (other compositions may be used as taught at p. 484 of Skeist's Handbook of Adhesives, Reinhold, 1962, 4th printing 1965), e.g.

| Material | Parts by weight |
|---|---|
| Polyvinyl chloride resin, medium molecular weight | 100 |
| Tetrahydrofuran | 100 |
| Methylethyl ketone | 200 |
| Tin organic stabilizer | 1.5 |
| Dioctylphthalate | 20 |
| Methyl isobutyl ketone | 25 |

A layer of wax as 60 between the top of the wall 22 and the bottom of the plate 881 provides an airtight seal at that surface. The metal surfaces of the spider 87 and of the saddle plate 881 are primed with an epoxy resin or a nitrile phenolic adhesive material. The epoxy resin or nitrilphenol bonds well to the polyvinyl chloride tube 83 as well as to the metal. The transition plate 89 is circular in outline and firmly attaches to the spider ring with an airtight fit. Thereby an airtight and watertight roof surface is provided between the top of the wall 22 and the plate 89. One lower end, 91, of the spiral tubing 83 is open to the interior 30 of the silo 22. The other upper end, 93, of the tubing 83 is operatively connected to opening 91 through tubing 83 and, where it is located to interior of the silo, a pipe 94 is operatively connected to end 93 and is firmly attached with an airtight connection to the plate 89 and that pipe 94 passes through and upward of the plate 89. A valve 95 is operatively connected to pipe 94 and conventional gate valve 95 is operatively connected to one upper end of a discharge conduit 96. The lower end 97 of conduit 96 is open downwardly exteriorly of the roof 26. Opening 91 communicates with opening 97 of conduit 96 only through the lumen or channel 81 in the tubing 83 and valve 95. This provides for a shock resistant flexible roof that is, nevertheless, entirely airtight when valve 95 is closed. This roof structure is also effectively weather tight although providing gas pressure relief when valve 95 is open. Thus, when the valve 95 is open the zone of relatively heavy oxygen-free and carbon dioxide-rich gas developed by the normal fermentation of the silage and which gas is located in part above the top surface of the mass of silage 21 in the silo 20 remains effectively undisturbed, notwithstanding dimensional changes of the silo. Such dimensional changes of the silo are caused by the usual temperature variations in the ambient air which temperature variations occur daily as well as at different times of the year. The conduit channel 81 in tubing 83 permits pressure release from the silo interior to the exterior of the silo when the temperature within the silo rises as due to temperature changes of the ambient air and radiation from the sun acting on the silo walls.

The operative connection of the air exterior of the silo to the interior of the silo through the tubing 83 permits air from the exterior of the silo to enter by conduit 96 into the top portion of the tubing 83 when the pressure in the interior of the silo is lowered relative to the pressure on the exterior of the silo, e.g. on barometric pressure changes and on expansion of the silo walls due to temperature increase. However, as the gases enter and leave the silo through valve 95, do so only in a long path of narrow cross section (the transverse cross sectional area of the channel 81) there is a minimum of mixing of outside air with the gas immediately above the silage mass 21 within silo 20 and within mass 21 although pressure release is provided by the structure hereinabove described. In the exemplary forty foot diameter, eighty foot high apparatus 20, with a hemispherically shaped roof 26, there are approximately 14,500 linear feet of plastic tubing as 83 of two inch internal diameter when there is a four foot diameter plate 89. Such a long narrow pathway effectively prevents access of fresh air to the mass of silage 21 in the silo when valve 95 is open although still providing for pressure release and relief to and from the silo interior as needed. The open frame 80 permits substantial flexing e.g. 1–3 inches across the forty-foot diameter of silo 20 and allows adjustment of the topmost layer of staves relative to each other and to the frame without the development of undue stresses therebetween. This flexible roof is particularly resistant not only to hail but also to the daily distortions in a silo due to temperature changes which cause varied daily as well as seasonal displacements of one portion of the silo wall with respect to the other.

The unloader assembly 28 comprises a discharge conduit assembly 100 and, operatively connected thereto, a silage pump means assembly 105. Conduit assembly 100 comprises a fixed discharge tube 101 exterior to wall 22, a movable interior tube 103 and a ballast assembly 104.

The discharge tube 101 is a firm wire reinforced rubber tubing firmly and positively kept open by the reinforcement in the walls thereof whereby it is prevented from collapsing. It comprises a first inlet portion 110, which is located interior of the silo wall and extends with from below the platform 87 to the transition plate 89, a second portion 111, which is smoothly curved from one end to the other, is attached in an airtight fashion to the outside and inside of the plate 89 and is continuous with portion 110, and a third portion, 112, continuous with the portion 111 and which is affixed to the top of the side wall of silo 22 and extends downward to the level of its discharge orifice 113. Discharge orifice 113 is located at a usual height of about ten feet over the ground for discharge into a receptacle 109 such as a truck and this discharge is accordingly located relatively near to the bottom of the silo 20 as is shown in the FIGURES 1 and 2, and below described.

Portion 111 is attached to plate 89 near to the edge thereof on the same side as the portion 112 is located. Portion 110 is attached to platform 87 at a portion slightly displaced from the geometric center of silo 20, the longitudinal axis of the right circular cylinder which forms the interior surface of wall 22, toward the side of the silo nearest on which portion 112 is located.

Tube 103 is a relatively flexible tube which is, nevertheless, maintained in its fully open position and made of rubber with wall reinforcing. The outer diameter of tube 103 is substantially smaller than the internal diameter of the tube 101. In the exemplary embodiment the tube 103 has an external diameter of seven inches and an internal diameter of six inches while the tube 101 has an external diameter of eleven inches and an internal diameter of ten inches. The tube 103 extends from the top of the pump means assembly 105 into the lumen or conduit channel of the tube 101. The tube 103 freely slidably fits within the lumen or channel of tube 101. In the upper position of assembly 105, as shown in FIGURE 2, the discharge end 116 of the tube 103 is relatively close to the bottom of the tube 101. At the lower position of the apparatus 105, as shown in FIGURE 1, the discharge end 116 of the tube 103 is relatively close to the top of the tube portion 112. Tube 103 is maintained relatively parallel to tube 101 by the ballast assembly 104; tube 103 is operatively attached to assembly 104.

The discharge end and orifice 116 of the tube 103, at the uppermost position of the assembly 105, extends downward only to slightly above the lower discharge end of the tube 101 exterior of the silo 22. The tube 103 thus extends from the top of the pump means 129 into the lumen or conduit portion of the exterior or discharge tube 101 and effectively and operatively extends thereinto regardless of the position of the assembly 105. The assembly 100 and the various parts thereof are, accordingly, supported on and cooperate with parts of the silo wall 22 and roof 26 assemblies.

Subassembly 105 comprises, in operative combination, an auger 121, a motor 123, a counterbalance weight 125, a wheeled frame 127, a fan 129, and a lifting mechanism 133, all attached to frame 127. Frame 127 is a rigid elongated open rectangular frame which extends horizontally across an interior diameter of the silo chamber 30. It rests, by the wheels of the frame on the silage mass 21 in the silo 20. The auger is supported on the sides of the frame 127 and operatively contacts the silage 21 therebelow. The auger is connected to and driven by the sealed electric or a hydraulic motor 123. The motor 123 operates the auger to drive the silage from the top of the mass 21 into the inlet of the fan 129. The fan 129 is also mounted on the frame 127 and drives material brought to the inlet thereof up the pipe 103. The motor 123 is also operatively connected to and drives the wheels as 131 and 132 of frame 127. The wheels 131 and 132 are operatively connected to frame 127 and move the assembly 105 in a rotary path about the central vertical axis of the silo 22 and provide for uniform discharge of the silage from the silo. A lifting assembly 133 is attached to the frame 127 and to the roof support platform 87. Rollers as 130 and 130' on frame 127 contact the inner surface of wall 22. Assembly 133 includes a lifting mechanism as shown in Patent 2,445,056 according to which a motor as 137 on platform 87 serves to raise or lower cables as 138' and 138 attached to the frame 127 and so adjust the height of the assembly 105 dependent on the control of such motor by a pressure sensitive switch as 139. The assembly 133 may include a pair of balancing weight boxes as 106 and 106.1 and a cable as 107 and 107.1 as in U.S. Patent 1,233,306 to expedite and facilitate the vertical adjustment of assembly 105. The weight boxes as 106 and 106.1 are located on diametrically opposite sides of the silo wall 22 for balancing effect. Motor 123' drives fan 129.

A pressure sensitive switch 139 contacts the silage mass 21 below the assembly 105 and maintains the auger 121 in contact with the mass by lowering the frame 127 when the thereby sensed pressure falls and thereby maintaining the auger in contact with the silage. The pressure sensitive switch serves to activate a lifting mechanism as shown in U.S. Patent 2,445,056. The weight of the silage pump means assembly 105 is borne on the silage mass 21 in the silo 22 and its discharge (the discharge of its pump means 129) is operatively connected to the inlet of the interior of tube 103.

The ballast assembly 104 comprises a weight 117, a flexible cable 118, an upper pulley 119, and a lower pulley 120 all in operative combination and supported on the silo wall 22. The flexible cable 118 is attached to the bottom portion of the tubing 103. Pulley 120 is firmly yet rotatably supported below the bottom of orifice 113 on one end of an adjustable arm 114.1 on a frame 114. The fixed end of the frame 114 is firmly attached to the wall 22 as by a column 36 or to the hoops on the wall 22. The frame 114 also is attached to the lower end of portion 112 of tube 101 and serves to position the lower end of portion 112 and its orifice 113 over the receptacle therefor as 109. The support for and the pulley 120 locate one end of cable 118 slightly inward of the inner edge of the orifice 113 in the lumen of the tube 101. Thereby the cable 118 does not catch or rub on the orifice 113 but is freely movable in portion 112 of tube 101. Pulley 119 is firmly yet rotatably located near the top of wall 22. It is preferably attached to a column as 36 or to the hoops as 73 and 74.

One end of cable 118 is attached to the lower end of tube 103 near its orifice 116: the cable 118 extends therefrom to the pulley 120, travels around the pulley 120 and extends to and over the upper pulley 119 and thence to the weight 117. The weight 117 is vertically movable and constrained to a vertical rectilinear path by guides therefor as 117.1 on wall 22. The weight of the weight 117 is as great as the entire weight of the tube 103; thereby the weight 117 serves to urge tube 103 downwards of tube 112 and maintain tube 103 parallel to tube 101 when the assembly 105 is at the bottom of the bin 20 as well as when the assembly 105 is in its uppermost position. Because the weight and cable 118 provide a force continually urging and keeping the lower orifice of tube 103 in its lowermost position, and keeps tube extended within tube 101, the inner pipe 103 slides smoothly in the outer pipe 101. Accordingly, regardless of the height of the assembly 105 the tubing 103 is always kept parallel to tube 101 and conveniently and efficiently provides for adjustment of tube 103 relative to tube 101 and expedites discharge of the silage from the mass 21 through the auger and fan of assembly 105, thence upwards through tubing 103 and tube 101 and outward and downward via tube 101 to the receptacle therefor, 109.

The silo wall 22 is provided with several like door assemblies as 160, 161 and 162. These are spaced about twenty feet apart vertically from each other. Each door assembly as 160 comprises, in operative connection, a rigid frame 165, a door as 166, handles as 167.1 and 167.2 and hinge assemblies as 168 and 169.

The frame 165 comprises rigid horizontal channels 171 and 172 and vertical channel members 173 and 174 firmly joined together. Lugs 171.1 and 171.2 on member 171, and lugs 172.1 and 172.2 on member 172 each project radially outward from the frame 165 and provide for attachment of hoops and 76 and 77 thereto. This avoids any loss of tension in the hoops that extend around the wall at the level of such door assemblies. The interior width of the channel members 171–174 is the same as the exterior width of the staves as 40–44 and a sealant such as 60 is provided on the channel surfaces bearing against the adjacent staves. Thereby an airtight seal is provided between the door frame and the adjacent stave. The projecting tongues of the staves are removed from those portions of the staves immediately adjacent to the door frame. The width of the frame is a full multiple of the width of the staves—twice in the exemplary embodiment—and the height of the frame is a full multiple of the height of the stave—the same size in the exemplary embodiment. Hinges 168 and 169 rest in seats 168.3 and 169.3 in frame 166. Thereby door 166 is hingedly attached to the frame 165. Hinges 168 and 169 are attached by resilient steel arms 168.2 and 169.2 to pivot arm 168.1.

Arm 168.1 is pivotally attached by journals 166.1 and 166.2 to door 166. By pressing arms 168.2 and 169.2 together, each door as 166 may be detached from its frame as 165.

Each door as 166 is provided with airtight seals 166.1 therearound to provide an airtight connection thereof to its frame when the door is closed. The handles as 167.1 and 167.2 keep the door firmly closed in its sealed position when such sealed position is desired.

During discharge of operations of assembly 28 at least one door—preferably adjacent the top of the apparatus as 160—is left open whereby to avoid the creation of a vacuum inside wall 22 by allowing air into chamber 30 freely to aid the operation of fan 129. During operation of the apparatus 28 roof valve 95 is also open. This permits air to be drawn in for operation of the pump to discharge the silage through the line 103 to the line 101 without creating vacuum in the lumen 81 of tube 83.

The exemplary embodiment of apparatus 20 is constructed by use of a vertically movable platform as 140. The platform 140 comprises an annular walkway 141, a support frame 143, a motor 145, a cable 147, base clamp 148 and pulley clamp 149 and a support pole 150 supported on base 31, operatively connected. The clamps 148 and 149 slidably fit on the pole 150 and may be locked for oneway movement therealong by the dogs as 1481 and 1491 on the clamps 148 and 149, respectively. The annular walkway 141 has an external diameter slightly smaller than the inner diameter of wall 22 and is firmly supported on the rigid frame 143. The motor 145 is supported on the ground and connected by the cable 147 via the upper clamp 148 to lower clamp 149. The cable 147 extends from clamp 148 down to the lower clamp 149 and provides for vertical movement of the lower clamp and the frame 143 supported thereon.

A rigid boom 146 is rotatably mounted on pole 150 and supported by frame 143, a clamp 1461 and sliding pulley on boom 146 provides for placing blocks as 42 in place along a portion of the wall as 221 under construction.

Apparatus 20 is constructed by jacking up the support platform 140 shown in FIGURE 14 by applying tension along the motor cable 147 and thus raising the clamp 149 and thereby raising the platform 140. A line of staves is then located in the wall 221. Dogs in the platform support 149 hold the platform in position until the next move. The annular platform provides a support for the workers. The workers as 1411 walk on the walkway 141 laying the additional staves until an additional height of platform is desired. At that point the motor 145 is again started. The cable 147 again acts on the lower clamp 149 urging it upward to a raised position. The dogs then lock against the post 150. The workers may then move the upper clamp 149 up 30 to 60 inches for the next step. Conventional guy wires help locate and align pole 150.

For the manufacture of the staves as 40–44, mixes of about 200 parts by weight of cement (Type 1 ASTM C–150) 100 parts by weight of silica flour and 2,300 parts by weight of sand and 2,200 parts by weight of coarse aggregate may be used.

The inner surface of each stave, as surface 45 of stave 40 is preferably concave and curved with an inner radius the same as the outer radius of the chamber 30 to minimize irregularities in the rotary motion of the assembly 105 about the longitudinal vertical axis of the cylindrical chamber 30.

The staves may be formed in molds according to the process shown in U.S. Patents 2,106,329, 2,275,676, 2,366,780 and 2,353,492. The concrete surface of the staves as 40–44 is full of a multiplicity of small holes as 67.1, 67.2, 67.3. Each of the joints as 61 and 63 are taped as shown at 51, 151 and 251 to effect a closure of such joint prior to pouring the wax thereinto.

The staves are put in place and the wax is poured at 250° F. in hot weather (of 70–100° F.) and at 300° F. in cold weather. This wax 60 is a microcrystalline wax known as Be Square 170 which has characteristics as at Table I.

*Table I*

| Properties | Be Square 170 |
| --- | --- |
| Melting point, ° F. | 170 |
| Specific gravity at 60° F. | 0.92–0.94 |
| Viscosity at 210° F. (Saybolt) | 75–100 |
| Flash point, ° F. | 500 |
| Fire point ° F. | 575 |
| Saponification number | < 2 |
| Acid number | 0.1–0.2 |
| Iodine number | 1.5 |
| Color | white |
| Penetration number (ASTM) (Petrolatum method —77° F.; 100 g. wt.) | 5–20 |

The wax is adherent to the concrete and as shown in FIGURE 5, penetrates the interstices on such stave surfaces as interstices 67.1, 67.2, 67.3 on stave 40 to form a firm bond therewith on the surface of the staves at the joints of cavities as 61–64 as shown for surfaces 157 and 67. This same penetration occurs at the compression (due to hoops as 71–74) force bearing surfaces as 58 and 268. The wax very readily penetrates into such holes in those surfaces and forms a firm bond therewith not only at the surfaces as 68 and 58 and in the vertical joint cavities as 61, 62, 63, and 64, but also in each of the horizontal reglets or grooves as 49.1 and 49.2 also at the top of each stave and on the tongues at the bottom of each stave. Additional to the characteristics of TABLE I, the microcrystalline wax 60 is characterized by ductility, high sealing strength, freedom from odor and taste, low temperature flexibility, and strong resistance to moisture vapor transmission. The solubility of Be Square waxes in terms of cloud point for various weights of each wax in 100 millileter of solvent is well known (p. 113 of Industrial Waxes by Bennett, Vol. 1, Chemical Publishing Company, Inc., 1963). Like other microcrystalline wax, the Be Square wax used is plastic and flows under compression (whereas paraffin wax will shatter under compression). The microcrystalline wax used is also characterized by a very substantial extensibility which makes it of particular utility in the use above described.

Once the hot wax is in the grooves as 49.1 and 49.2 and 349.1 and 349.2 on the top surface of each stave as 40 and 43, the block thereabove is added thereto. The downwardly projecting locking tongues, as 450.1 and 450.2 enter into the grooves as 349.1 and 349.2 therebelow while the wax is still hot, and form a firm bond between said liquid microcrystalline wax and said downwardly extending tongues and between said wax and the grooves at the bottom of the stave as each stave is laid( in the same manner as shown for cavities 61–64). Following the location of such stave a tape as 51, 151 and 251 is laid across the joints neighboring to such added blocks. Additional wax is poured in at 250° F. to 300° F. and forms a firm seal between said adjacent vertical surfaces of adjacent staves on the side of the cavities such as 61–64 for such added stave and its neighboring staves. Wax is also added to the tongues as 58 prior to locating the stave in position.

The staves are so set that the vertical rabbet surfaces as 58 and 268 are aligned with each other so as thereby to afford continuous seals.

When the hoop draw bolts as 751 and 752 are manipulated so as to tighten the hoops as 71, the wall 22 will be slightly contracted in the arc of the circle and this will have the effect of making the vertical walls of the pivotal seats pinch the wax adjacent the vertical faces as 68 and 158 of such seats and thus secure the staves in the desired working position and form a seal.

Figure 10:
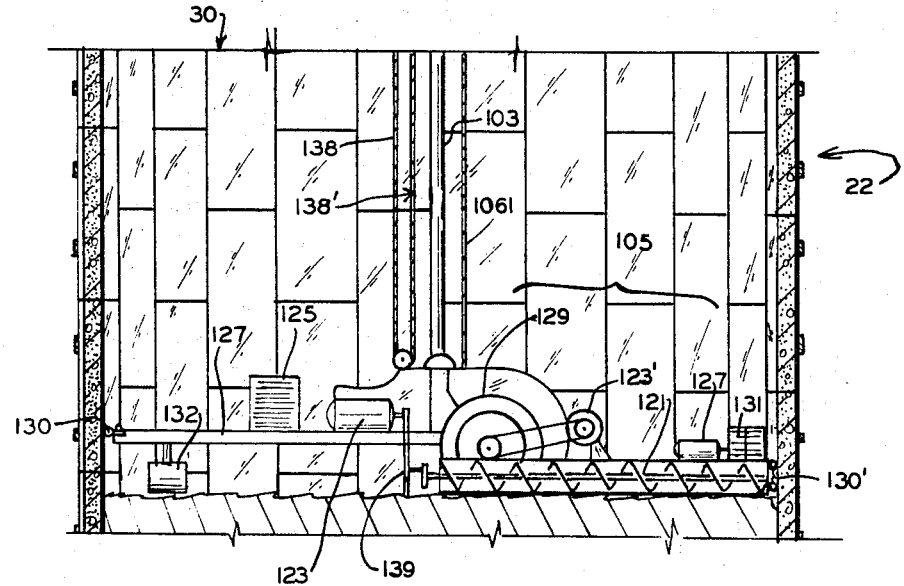
FIGURE 10 is an enlarged view of the silage pump assembly 105 shown in FIGURES 1 and 2.

The positions of the staves in the respective courses are generally as shown in FIGURES 1, 4 and 9, 10 with horizontal joints in the same plane at intervals no less than one stave apart as shown in FIGURES 1, 4 and 10.

However, it is within the scope of this invention that the slabs may be positioned so that they will break joints and no horizontal joint will be in the same plane at intervals of less than four as shown in FIGURE 11, to afford a particularly strong wall.

The embodiment of apparatus 120 as shown in FIGURE 11 comprises a wall 22, a base 24, and a roof 26 as in the embodiment 20. However, the unloading system 328 is different from the unloading system 28 shown in the embodiment 20. The unloading system 328 in the apparatus embodiment 120 comprises the same silage pump means assembly 105 and lower portion of tube 103 as used in assembly 20; however in this embodiment 120 a discharge tube 328 which extends from the top of the silo wall 22 to the point of discharge 333 is used. The tube 328 is provided with downwardly directed inlet chutes and orifices as 329, 330 and 331 for the insertion thereinto of a curved tube 210, which extends from a tube 103 and is of fixed length to such inlets as 329, 330, 331 and 332. For this purpose the windows as 160, 161, 162, 163 are used to provide access of the tube 210 to the orifices as 330. The pipe 210 is supported in an adjustable cable 211 controlled from platform 87.

In both apparatus 120 and 20 the feed of the distributor pipe 155 which enters into the transition plate 89 and is firmly and airtightedly supported thereon is provided with a motor 156 which drives a gear 157 train which serves to rotate a discharge spout 158 for distribution of the silage into the silo cavity 30 within the silo walls below the roof 26. The same assembly 130 is used.

In the embodiment 520 shown in FIGURE 12, the silo wall 22 and roof 26 and discharge assembly 105 are the same as in embodiments 20 and 120 but the lower portion of the discharge line 103 from the assembly 105 meets the pipe 155 and connects thereto directly. The pipe 301 is quite similar to the portions 112 and 111 of tube 101 of embodiment 20; it is attached firmly at its top to the plate 89 as a curved portion 310 and has a downwardly extending portion 312 with a discharge orifice 313 at its bottom. A tee 314 provides for transfer of silage from a feed receptacle 509 and a pump 505, uses the pipe 301 to blow silage into and upward of tube 301. The same tube or pipe 301 is used for two purposes, i.e. loading the silo and unloading the silo. A conventional gate valve 507 in line 506 avoids passage into receptacle 509 from line 301. Valve 510 is closed when pump 505 operates.

It will be noted that the use of the microcrystalline wax and staves provide a readily built apparatus such as 20 which is, nevertheless, airtight and extremely resistant to wind loads and temperature stresses. The vibrations which are usually inherent in an oscillating or rotating unloading apparatus such as 105 do not harm the walls of 22 according to the embodiment as 20 or 120 because the seal, i.e. the microcrystalline wax used between the staves, does not lose its sealing properties notwithstanding such vibrations as well as that it does not lose its sealing properties because of temperature stress applied to the silo wall.

The apparatus of the invention maintains an effectively air-tight condition in the silo during the storage of the silage into the silo and the access of air to the contents of the silo is, notwithstanding the daily and seasonal temperature stresses applied thereto is effectively, zero. Accordingly, there is a minimum of loss of the nutrient value of the silage by excessive oxidation. The wall 22 serves to keep an airtight condition of the interior of the silo and the roof cooperates with the walls to maintain this airtight condition notwithstanding temperature stresses and other mechanical stresses such as wind that may be applied to the silo. In the embodiment 20 unloading of the silage is accomplished without the requirement that human operators enter into the interior 30 of the silo, where the oxygen content is low.

The chordal width of tongue 68 of the exemplary stave 40, i.e. the width of the chord across curved surface 58 between surfaces 56 and 57 is 2⅝" (two and five-eighths inches). The width across stave 40 from face 57 to face 67 is 11 inches; this is about ¼" greater than across stave 40 from face 56 to face 66. The chordal width of groove 68 is 2¼" (two and one-quarter inches). The minimum thickness of the stave 40, i.e. the distance from surface 45 to the point of maximum depth of the recess portion 52, is four inches hence the chordal width of the laterally projecting vertically extending tongue 58 is approximately one-half the full six inch thickness of the stave, the width of that tongue is more than one-half of the minimum thickness of the stave, i.e. more than one-half the thickness of the stave 40 exclusive of the portion of the stave more distant from the inner surface 45 than the deepest portion of recess 52. The tongue 58 projects laterally ⅝ inch from the adjacent flat outer shoulder surfaces 57 and the grooves as 68 have a maximum depth of one-half inch from the adjacent outer flat surfaces such as 67. Thus the tongues as 158 of stave 41 would bear the entire force of compression on such staves by the contraction of hoops such as 71–74. The radius of curvature of the tongue as 58 and of the grooves as 68 is the same, 1⅝" in the exemplary stave 40. Recess 52 has a radius of curvature of 4½".

The vertical cylindrical axis (or central line) of tongue 58 and groove 68 are each located two inches from the inner stave face 45, hence the force of compression due to the hoops contraction is transmitted through the center portion of the stave and not by the portion of the stave more distant from surface 45 than the deepest part of recess 52, i.e. the part of recess 52 closest to wall 45. This avoids compound stresses on the stave 40 that might result in tensile stresses across the shoulders or other portions of the staves such as 40. The outer surface or shoulder 53 and 54 (each 1½" wide in the stave 40) may be coated with the wax 60 in the same manner as surface 67 is coated to avoid development of other than compressive stresses on stave shoulders such as 53 and 54 by the hoops as 71.

The grooves 49.1 and 49.2 are each ⁷⁄₁₆ of an inch wide, hence they occupy a total of no more than one quarter of the four inch minimum thickness of the stave 40. The outer groove 49.1 is located with its outer edge at the outer edge of tongue 58 and groove 68. Groove 49.1 has in transverse sectional view a sem-cylindrical outline with a ⁷⁄₁₆ inch diameter. The inner groove 49.2 is located with its outer edge adjacent the inner edge of groove 68 and the inner edge of tongue 58. The tongue 350.1 and the tongue 350.2 are ⅜ inch deep; the grooves as 49.2 are ⁷⁄₁₆ inch deep. The tongue is ⅜ inch wide at its base. Thereby the entire weight of the stave as 44 above a stave therebelow as 43 is borne by the flat shoulders as 450.3, 450.4, and 450.5 on either side of the tongues and grooves as 350.2 and 349.2 and 350.1 and 349.1.

Although in accordance with the provision of the patent statutes, particular preferred embodiments of this invention have been described and the principles of the invention have been described in the best mode in which it is now contemplated applying such principles, it will be understood than the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:
1. A silo comprising the combination of a cylindrical wall, a roof, and an unloading means,
   said wall being formed of a foundation and a plurality of like rigid concrete staves supported thereon, said staves having generally matching vertically extending side surfaces and generally matching horizontally extending bearing surfaces, one of said vertically extending surfaces having a vertically extending later- ally projecting tongue, and the other vertically extending side surface having a groove mating with a like tongue, one of said horizontally extending surfaces has a vertically projecting laterally extending tongue and a bearing shoulder, and the other horizontal surface has a groove to receive a similar tongue and has a shoulder to match a similar shoulder, the surface curvature of the tongue and groove vertically extending on the side surfaces being the same and the lateral depth of the vertically extending laterally projecting tongue being greater than the depth of the groove therefor, and the vertical depth of the laterally extending vertically projecting tongue on the horizontal surface being less than the depth of the groove therefor on said staves, a sealing material between adjacent surfaces of adjacent staves, said sealing material being plastic and adherent to the adjacent surface of said staves and forming a continuous airtight and watertight seal therebetween, and contractible external hoops applied around the wall structure and serving, when contracted, to draw such slabs into close association and simultaneously to compress said sealing material interposed between said surfaces;

said roof comprising an open deformable frame firmly attached to the walls and a continuous flexible waterproof surface thereover, said waterproof surface comprising flexible tubing, said tubing being in the form of a continuous spiral, a lumen extending through the length of said tubing, the adjacent portions of said tubing being joined to each other in a watertight and an airtight manner, one end of the lumen of said tubing being open to the interior of the silo, the other end of said tubing being open to the exterior of said silo, and said tubing and said wall joined in an airtight manner;

said unloading means comprising silage gathering means, pump means, frame means, frame support means and a discharge conduit assembly operatively connected, said discharge conduit assembly being connected to the discharge of said pump, said discharge conduit assembly comprising a first, ascending, flexible tube and a second, descending, tube, said first, ascending, tube having a flexible portion, the inlet end thereof being attached to said pump means and another outlet, end of said first, ascender, tube being slidably located within the second descending tube, said second, descender, tube comprising a curved portion supported on the frame of said roof and extending from within the roof of said silo outward of said silo and downwardly toward and adjacent to the side of the silo and a second portion, said second portion extending from the top of the silo to a position displaced from the side of the silo near to the bottom thereof.

2. Apparatus as in claim 1 wherein the second descending tube extends downward externally of said silo wall beyond the outlet end of the first, ascending, tube, and means are attached to the bottom of the ascending tube urging said outlet end of said ascender tube downward in said descender tube second portion, said urging means comprising a cable means attached to the outlet end of said second ascending tube and said cable means is operatively attached to weight means, a support means for said second portion of said descender tube is attached to said silo wall and sheave means for said cable means is attached to said silo wall, and said cable means is supported in part on said sheave means.

3. In a silo including a roof the improvement comprising a roof comprising an open deformable frame supported on the silo walls and a continuous flexible waterproof surface thereover, said waterproof surface comprising flexible tubing, a lumen extending through the length of said tubing, the adjacent portions of said tubing being joined to each other in a watertight and an airtight manner, one end of the lumen of said tubing being open to the interior of the silo, the other end of said tubing being open to the exterior of said silo, and said tubing and said wall joined in an airtight manner.

4. Apparatus as in claim 3 wherein, said tubing is in a series of adjacent curved portions.

5. Apparatus as in claim 3 wherein, said tube is in the form of a continuous spiral.

6. A silo unloading means for a silo comprising a wall and a roof, comprising silage gathering means, pump means, frame means, frame support means and a discharge conduit assembly operatively connected, said discharge conduit assembly being connected to the discharge of said pump, said discharge conduit assembly comprising a first, ascending, flexible tube and a second, descending, tube, said first, ascending, tube having a flexible portion, the inlet end thereof being attached to said pump means and another, outlet, end of said first, ascender, tube being slidably located within the second, descending, tube, said second, descending, tube comprising a curved portion supported in part on the roof of said silo and extending from within the roof of said silo outward of said silo and downwardly toward and adjacent to the side of the silo and a second portion, said second portion extending from the top of the silo to a position displaced from the side of the silo near to the bottom thereof.

7. Apparatus as in claim 6 wherein the second descending tube extends downward externally of said silo beyond the outlet end of the first ascending tube, and means are attached to the bottom of the ascending tube urging said outlet end of said ascender tube downward in said descender tube second portion, said urging means comprising a cable means attached to the outlet end of said second ascending tube and said cable means is operatively attached to weight means, a support means for said second portion of said descender tube is attached to said wall of said silo and sheave means for said cable means is attached to said wall of said silo and said cable means is supported at least in part on said sheave means.

8. A silo unloading means for a silo comprising a wall and a roof, comprising:

silage gathering means, air pump means for impelling silage through said gathering means, frame means, frame support means and a closed discharge conduit assembly, all operatively connected:

said discharge conduit assembly being operatively connected to the pump, said discharge conduit assembly comprising a first, ascending, movable, tube and a second, descending, tube, one end of said first, ascending, tube being slidably located within the second, descending, tube; said second, descending, tube comprising a curved portion fixedly supported in part on the roof of said silo and extending downwardly toward and adjacent to the side of the silo and a second portion, said second portion extending from the top of the silo to a position displaced from the side of the silo near to the bottom thereof.

References Cited

UNITED STATES PATENTS

| 1,143,954 | 6/1915 | Hague | 52—227 |
| 1,258,839 | 3/1918 | Wheeler | 52—227 |
| 1,383,166 | 6/1921 | Steinkraus | 52—224 |
| 2,074,592 | 3/1937 | Rowell | 52—224 |
| 2,500,043 | 3/1950 | Radtke | 222—405 X |
| 2,580,306 | 12/1951 | Leach et al. | 222—405 X |

ROBERT B. REEVES, *Primary Examiner.*

HADD S. LANE, *Assistant Examiner.*